FREQUENCY CONTROL SYSTEM FOR RADIO FREQUENCY DISCRIMINATORS

Filed July 26, 1960 2 Sheets-Sheet 1

INVENTOR.
BENJAMIN FISHER

BY Edward A. Sokolski

AGENT

FREQUENCY CONTROL SYSTEM FOR RADIO FREQUENCY DISCRIMINATORS

Filed July 26, 1960

INVENTOR.
BENJAMIN FISHER

BY Edward A. Sokolski

AGENT 3,092,780
Patented June 4, 1963

3,092,780

FREQUENCY CONTROL SYSTEM FOR RADIO FREQUENCY DISCRIMINATORS

Benjamin Fisher, Whittier, Calif., assignor to North American Aviation, Inc.

Filed July 26, 1960, Ser. No. 45,343
13 Claims. (Cl. 329—139)

Figure 1:
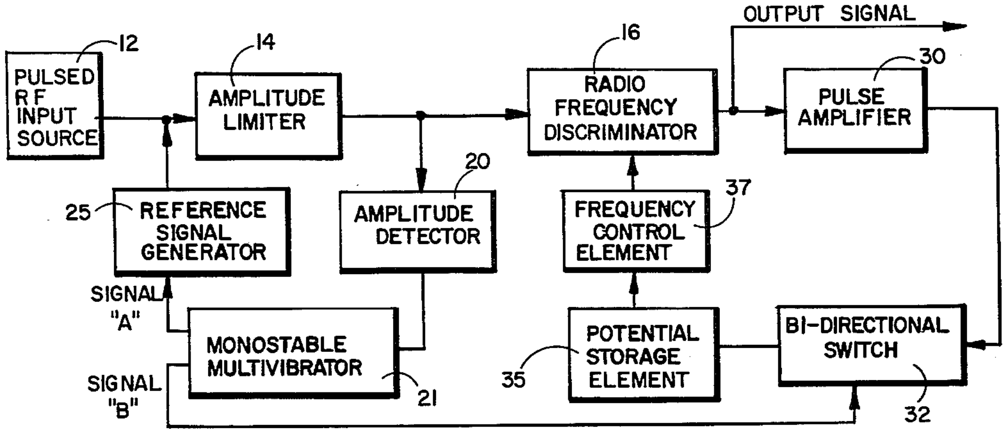

This invention relates to a frequency control system for radio frequency discriminators and more particularly to such a system in which a radio frequency discriminator is automatically tuned to the output frequency of a reference signal generator.

Radio frequency discriminators are widely used as frequency modulation detectors and in various test and control applications in which an output signal is desired in accordance with the deviation of an input signal from a predetermined frequency to which the discriminator is tuned. In order to produce an accurate indication of such deviation from a predetermined frequency frequency, it is essential that the tuned frequency of the discriminator be maintained within close tolerances. In many radio frequency discriminator control systems now in use, the discriminator is tuned to the frequency of the incoming signals to be detected. In the device of this invention, however, rather than being tuned to the frequency of the input signals the discriminator is automatically tuned to a predetermined reference frequency, and the output of the discriminator is proportional to deviations of the input signals from this reference frequency. This type of control system is useful, for example, in test equipment for checking and precisely adjusting the frequency of a signal generating device and in control equipment for precisely slaving the frequency of a signal source to that of a reference signal generator. Such a system might be utilized, for example, to control the frequency of a generator of radio frequency signals.

It is essential in the device of the invention that the input signal arrive in periodic pulses to enable the generation of a proper control signal. This does not, however, preclude the use of applicant's device in conjunction with devices having a continuous wave output. The output of a continuous wave source can be "chopped" or modulated by techniques well-known in the art to provide an appropriate intermittent input signal for the control system.

In the device of the invention, an output signal which is proportional to the deviation of a pulsed RF input signal from a predetermined reference frequency is generated. In accomplishing the end result, the radio frequency discriminator to which the pulsed RF signals are fed is precisely tuned at all times to the output frequency of a reference signal generator. This tuning process is accomplished without interfering with the normal detection process of the discriminator by feeding the output of the signal generator to the discriminator during time periods between the time of arrival of the pulsed input signals. This is achieved by using means responsive to the pulsed signals for connecting the output of the reference signal generator to the input of the discriminator during a predetermined time interval following the time of arrival of the pulsed input signals. During the time of arrival of the RF input pulses, the output of the reference signal generator is kept disconnected from the radio frequency discriminator input.

During the time that the reference signal generator is connected to the radio frequency discriminator, the output of the discriminator will reflect the deviation of its tuned frequency from that of the reference signal generator. This discriminator output signal is fed to a storage element, the output of the storage element being fed to means which is used to control the tuned center frequency of the discriminator. The means responsive to pulsed input signals is used to control a switch which couples the output of the radio frequency discriminator to the storage device only during the time that signals from the reference signal generator are being fed to the discriminator. The device of this invention thus provides a simple yet effective means for precisely tuning the frequency of a radio frequency discriminator to that of a reference signal generator. This enables the generation of an output signal precisely indicative of any deviation in frequency of pulsed input signals from the frequency of the output of a reference signal generator.

It is therefore an object of this invention to provide an improved control system for controlling the tuned frequency of a radio frequency discriminator.

It is another object of this invention to enable the slaving of the tuned frequency of a radio frequency discriminator precisely to the frequency of a reference signal generator.

It is still another object of this invention to provide means for precisely determining the deviation in the frequency of an input signal from a predetermined reference frequency.

It is still another object of this invention to provide means for precisely tuning a radio frequency discriminator to a predetermined reference frequency immediately preceding the detection by said discriminator of input signals.

Figure 2:
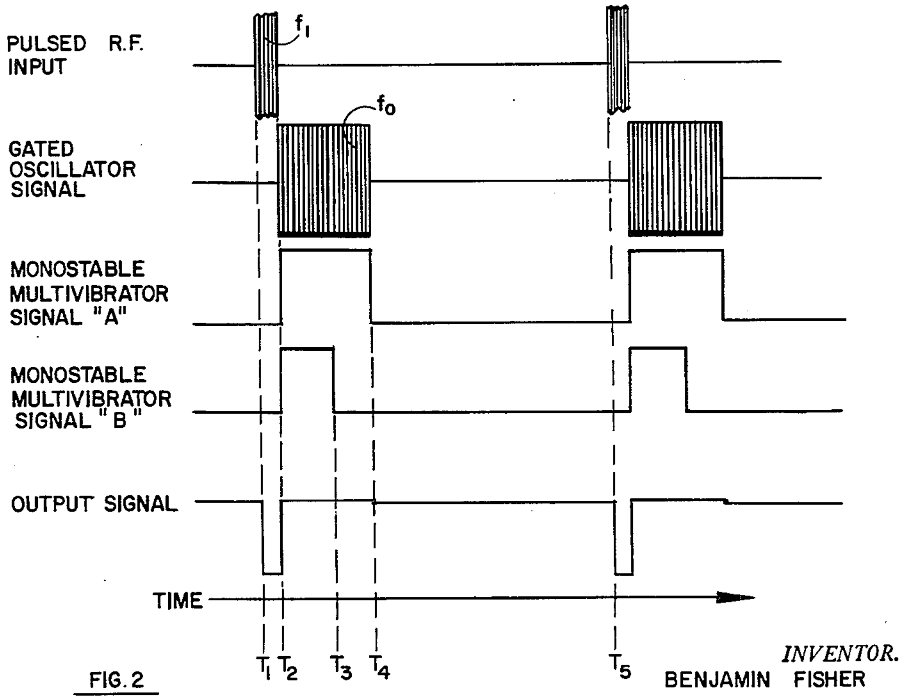
Figure 3:
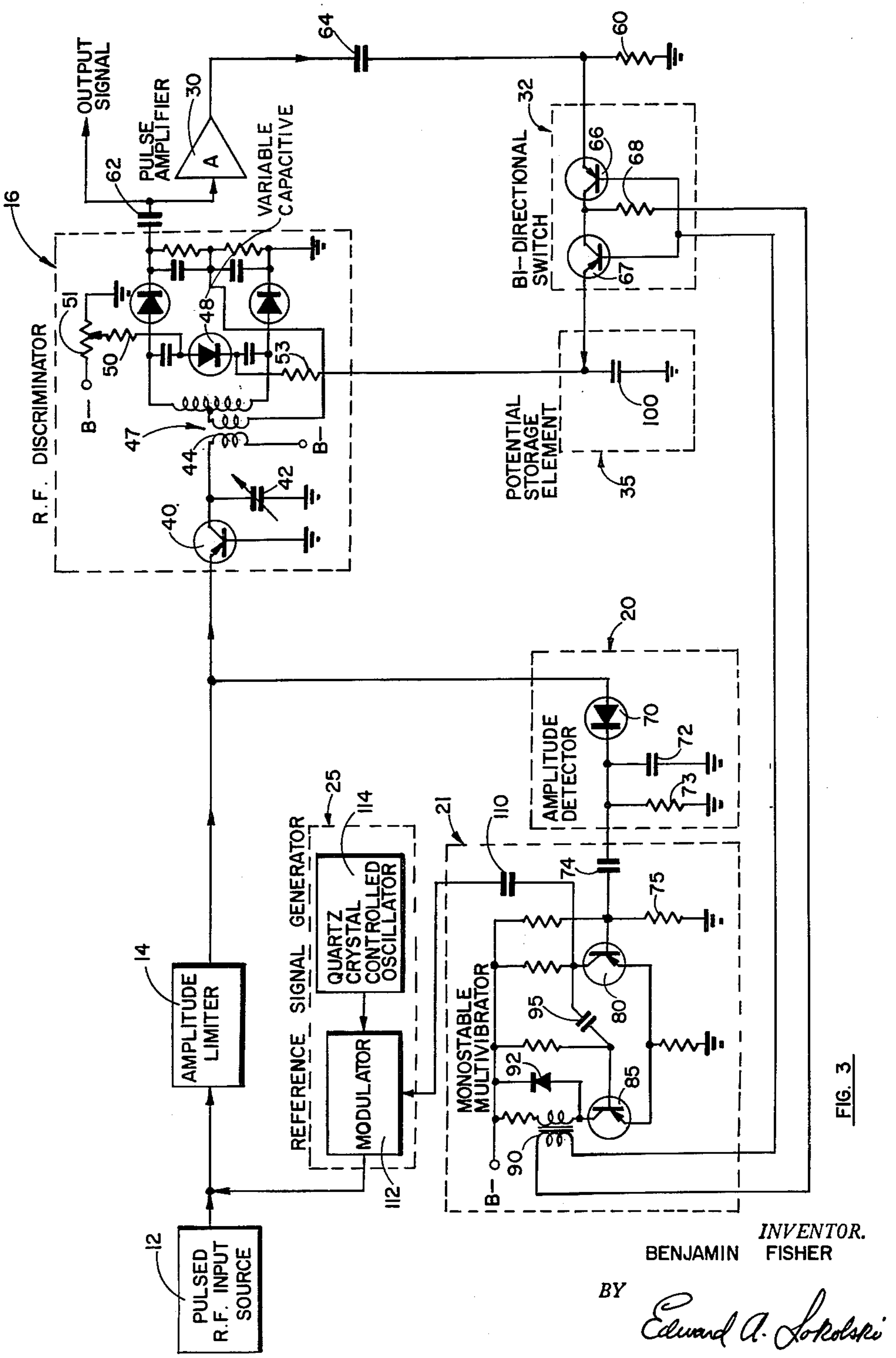

Other objects of this invention will become apparent from the following description taken in connection with the accompanying drawings in which:

FIG. 1 is a block diagram illustrating the basic operation of the device of the invention, FIG. 2 is a series of waveforms illustrating the operation of the device of the invention, FIG. 3 is a functional schematic diagram illustrating a preferred embodiment of the device of the invention.

Referring to FIGS. 1 and 2, the basic operation of the device of the invention is illustrated. A pulsed RF input having an RF frequency, $f_1$ as illustrated in FIG. 2, is fed from pulsed RF input source 12 to amplitude limiter 14. Pulsed RF input source 12 may comprise a signal generating device whose normal output is pulsed or may comprise a signal generating device whose normal output is continuous with a "chopper" or modulator interposed between its output and the input to amplitude limiter 14. Amplitude limiter 14, is a conventional limiter circuit biased so that it is driven to saturation by all amplitude levels of input signals from source 12 so that the amplitude of its output signal is constant regardless of deviations in the amplitude of the signals from pulsed input source 12.

The output of amplitude limiter 14 is fed to radio frequency discriminator 16. Radio frequency discriminator 16 may be any conventional discriminator, such as, for example, the Armstrong, Seeley or ratio detector types commonly in use. The output of radio frequency discriminator 16 will be a D.-C. pulse signal having a magnitude and polarity indicative of the frequency deviation of the input signal from the tuned center frequency of the discriminator. A typical output signal which might be generated with a pulsed RF input to the discriminator during the time interval $T_1$—$T_2$ is shown in FIG. 2. This output signal may be used, for example, to automatically or manually tune pulsed input source 12 to the center frequency of radio frequency discriminator 16.

The output of amplitude limiter 14 is also fed to amplitude detector 20 which detects or demodulates the envelope of the pulsed RF input to produce a unidirectional pulse (not shown) having a time period, $T_2$ minus $T_1$. The output of amplitude detector 20 is fed to monostable multivibrator 21. This signal is differentiated in the input circuit of this monostable multivibrator as to be explained further on in the specification with reference to FIG. 3, and the signal derived from the trailing edge of this signal is used to drive the multivibrator to its astable state. During the astable state of multivibrator 21, a positive going square wave indicated as signal "A" in FIGS. 1 and 2 is fed to reference signal generator 25. Multivibrator signal "A" has a period $T_4$ minus $T_2$ which is determined by the time constant of the R-C components thereof and the voltage applied thereto. Reference generator 25 is keyed by signal "A" from monostable multivibrator 21 so that it will have an output (indicated in FIG. 2 as the gated oscillator signal) during the interval $T_2—T_4$ when signal "A" is positive going. The output of reference signal generator 25 is fed to discriminator 16 through amplitude limiter 14 which limits this signal to a uniform amplitude.

During the period when the reference generator 25 is keyed by signal "A," radio frequency discriminator 16 will have an output proportional to the deviation of the frequency, $f_0$ of the output of the reference signal generator from that of the center frequency of the discriminator. This output signal is amplified in pulse amplifier 30 and fed to bi-directional switch 32.

Bi-directional switch 32 is controlled by the signal "B" output of monostable multivibrator 21 which is fed thereto. The signal "B" output of monostable multivibrator 21, as indicated in FIG. 2, has a period $T_3$ minus $T_2$ which is shorter than the period of signal "A." This is to assure that bi-directional switch 32 is not closed at any time when signals from reference generator are not being fed to the discriminator which possibly could be the case if signal "B" had the same period as signal "A" and there were some delay in the termination of the keying of this switch by signal "B." As will be explained in connection with FIG. 3, this might adversely affect the accuracy of the control action.

The output signal from pulse amplifier 30 is fed through bi-directional switch 32 to storage element 35 during the time interval, $T_2—T_3$ when signal "B" is positive going. Storage element 35 which may be, for example, a capacitor, stores the signals fed thereto through the bi-directional switch. The output of storage element 35 is fed to frequency control element 37 which is used to control the tuned center frequency of radio frequency discriminator 16. The details of the operation of the frequency control element will be explained in connection with FIG. 3.

Referring now to FIG. 3 which is a functional schematic of a preferred embodiment of the device of the invention, the output of pulsed RF input source 12 is fed through amplitude limiter 14 to radio frequency discriminator 16. Radio frequency discriminator 16 has an input driver transistor amplifier stage 40 with a tuned input circuit comprised by variable capacitor 42 and the primary winding 44 of transformer 47. The frequency discriminator circuit with the exception of resistors 50, 51 and 53 and diode 48 which are used in the frequency control for the discriminator is a conventional Armstrong phase shift type discriminator which is well-known in the art. Diode 48 is a silicon diode which is back biased by means of a B— supply (not shown) fed across variable resistor 51, resistor 50, resistor 53 and capacitor 100. As is well known in the art, the effective capacitance of a silicon diode biased in this fashion will be determined by the voltage applied across the diode. Such capacitance variation in accordance with the voltage applied to the diode is described, for example, in Patent No. 2,915,631, to O. K. Nilssen inventor, filed October 8, 1956.

Potentiometer 51 may be adjusted to set the voltage across diode 48, thereby changing diode capacitance to tune the nominal center frequency of the discriminator. The output of discriminator 16 is fed through capacitor 62 to pulse amplifier 30 where it is amplified and fed through capacitor 64 to the emitter of transistor 66 in bi-directional switch 32. Resistor 60 is the input resistor for transistor 66. Bi-directional switch 32 is normally open and is closed by a signal from monostable multivibrator 21. During the time of arrival of pulsed RF signals from signal source 12 (time interval $T_1—T_2$ as indicated in FIG. 2) monostable multivibrator 21 is in its stable state, bi-directional switch 32 is open and no signals are fed through the switch. The pulsed RF signals from signal source 12 as limited by amplitude limiter 14, are fed to diode detector 70 in amplitude detector 20. These signals are rectified by detector 70 and filtered by capacitor 72 in the output circuit of the detector. This output signal from detector 20 is the detected envelope of the pulsed input signal from source 12 which is a positive going square wave. This positive going square wave is fed to a differentiator comprised by capacitor 74 and resistor 75 to produce at the base of transistor 80 a positive going pulse for the leading edge of this square wave and a negative going pulse for the trailing edge of the square wave.

Except for the load circuit in the collector circuit of transistor 85 comprised by transformer 90 and diode 92, monostable multivibrator 21 is a conventional R-C type monostable multivibrator. The multivibrator is biased so that transistor 85 is normally conducting and transistor 80 is normally cut off. Transistor 80 is of the PNP type and a negative pulse at its base will cause it to conduct. The negative going pulse which is produced by the differentiation of the trailing edge of the output from amplitude detector 20, will drive transistor 80 to conduction which by multivibrator action will cut off transistor 85. Transistor 80 will conduct for the time constant determined by capacitor 95 and the associated resistance in the circuit while transistor 85 will be cut off for this same time period. The output signal appearing across the secondary of transformer 90, however, will be a function of the LR time constant of the primary winding of this transformer and the resistance of the circuit comprising transistor 85 and the associated resistors. This time constant is designed to be less than that of the multivibrator RC timing circuit so that with the cut off of current flow in transistor 85, there will be a transient current produced in transformer 90 which will result in a wave having a period $T_3$ minus $T_2$ as indicated in FIG. 2 (multivibrator signal "B") which is determined by the LR time constant of the transformer winding and the resistance in series with the collector circuit of transistor 85. The generation of signal "B" having a shorter period than signal "A" is necessary to assure that bi-directional switch 32 which is controlled by this square wave, cannot possibly be closed at any time when the reference signal is not being fed to discriminator 16. If such were the case, potential storage element 35 would have a discharge path through the switch and resistor 60 to ground and the voltage fed from potential storage element 35 to the control element in the discriminator would not accurately represent the desired control signal. Diode 92 is used to shape the wave produced by the transient current surge.

The output winding of transformer 90 is coupled through resistor 68 to transistors 66 and 67 in bi-directional switch 32 so that the output signal in these windings keys the bi-directional switch during the time interval $T_2—T_3$. Bi-directional switch 32 couples either a positive or negative going output signal across resistor 60 in accordance with the output of discriminator 16 which is fed through pulse amplifier 30. This signal is fed through the bi-directional switch 32 to capacitor 100 which comprises potential storage element 35. The capacitor 100 will be charged in accordance with the magnitude and polarity of this signal. The potential at the top end of capacitor 100 is coupled through resistor 53 to the cathode of diode 48. The bias across diode 48 will be varied in accordance with the potential appearing across capacitor 100 which in turn is proportional to the output voltage from the discriminator. As already noted, the effective capacitance of diode 48 is a function of the voltage applied across this diode. Hence, the capacitance of diode 48 is varied in accordance with the voltage applied from storage element 35 so as to tune the discriminator to the frequency of the reference signal generator. Such tuning of course, will tend to minimize the output signal from the discriminator and hence the control voltage fed across capacitor 100.

As already noted with reference to FIG. 1 the "A" signal from multivibrator 21 (indicated in FIG. 2) is fed to key reference generator 25. This "A" signal is fed through capacitor 110 in the output circuit of the monostable multivibrator 21 to modulator 112 in the reference signal generator. Crystal controlled oscillator 114 operates continually. Its output, however, is gated through modulator 112 only during the time interval when signal "A" is positive going. Modulator 112 may be any conventional gating circuit which will gate signals through in response to a positive going control signal. The reference signal generated by crystal controlled oscillator 114 is fed through modulator 112 to amplitude limiter 14 and hence to discriminator 16 during the time interval $T_2$—$T_4$ when signal "A" from the monostable multivibrator is positive going (see FIG. 2).

Crystal controlled oscillator 114 may be any conventional crystal oscillator circuit having frequency stability in accordance with the desired frequency tolerance requirements. Crystal controlled oscillator 114 is not keyed directly by the output of the monostable multivibrator 21 to avoid unstability which might be encountered with intermittent starting and stopping of this oscillator. As already noted, potentiometer 51 is used to adjust the voltage applied across diode 48 to tune the discriminator 16 to the desired nominal center frequency.

While circuitry has been shown using transistors and semi-conductor diodes, it is obvious that vacuum tubes could be used to equal advantage if so desired.

The device of this invention thus provides a simple yet effective means for continually tuning an RF discriminator to a desired reference frequency as the discriminator is used to detect pulsed RF input signals. This is accomplished by time sharing the discriminator between periods of tuning and periods of detection. In this manner, the precise tuning of the discriminator at all times can be assured.

While the invention is described and illustrated in details it is to be clearly understood that the same is by way of example and illustration only and is not to be taken by way of limitation, the spirit and scope of this invention being limited only by the terms of the appended claims.

I claim:

1. In combination a frequency discriminator, a source of pulsed signals coupled to the input of said discriminator, and means for automatically tuning said discriminator to a predetermined frequency comprising a reference signal generator having an output signal of a fixed frequency corresponding to said predetermined frequency, means for controlling the frequency of said discriminator, and means for coupling the output of said signal generator to the input of said discriminator and the output of said discriminator to said frequency controlling means during a predetermined time interval between successive intervals of pulsed signals from said pulsed signal source.

2. A system for generating an output signal indicative of the deviation in frequency of the output of a pulsed signal source from a predetermined frequency comprising a discriminator, the output of said pulsed signal source being coupled to the input of said discriminator, a reference signal generator having an output signal of a fixed frequency corresponding to said predetermined frequency, means for controlling the tuned frequency of said discriminator, and means responsive to the output of said pulsed signal source for simultaneously causing the output of said reference signal generator to be coupled to the input of said discriminator and the output of said discriminator to be coupled to said controlling means during a predetermined time interval occurring between successive intervals of output signal pulses from said signal source.

3. A system for automatically tuning a discriminator to a predetermined frequency comprising a source of pulsed radio frequency signals coupled to the input of said discriminator, a reference signal generator having an output signal of a fixed frequency corresponding to said predetermined frequency, a potential storage device, frequency control means responsive to the output of said potential storage device for controlling the tuned frequency of said discriminator, and means responsive to the output of said pulsed signal source for simultaneously causing the output of said reference signal generator to be connected to the input of said discriminator and the output of said discriminator to be connected to said potential storage device during a predetermined time interval occurring between successive intervals of output signal pulses from said pulsed signal source.

4. The device as recited in claim 3 wherein said means responsive to the output of said pulsed signal source comprises an amplitude detector connected to receive the output of said pulsed signal source, and a monostable multivibrator responsive to the trailing edge of the output of said amplitude detector.

5. A system for generating an output signal indicative of the deviation in frequency of the output of a pulsed signal source from a predetermined frequency comprising detector means tunable to a center frequency having an output in accordance with deviations in frequency of signals fed thereto from said center frequency, the output of said pulsed signal source being coupled to said detector means, means for generating a signal having a fixed frequency corresponding to said predetermined frequency, means for tuning said detector means in response to the output of said detector means during a predetermined time interval, and means responsive to the output of said pulsed signal source for coupling the output of said signal generating means to the input of said detector means and the output of said detector means to said tuning means during said predetermined time interval, whereby said detector means is tuned to the frequency of the output of said signal generating means.

6. The device as recited in claim 5 wherein said coupling means operates in response to the trailing edge of the output of said pulsed signal source.

7. A system for controlling the center frequency of a radio frequency discriminator used to detect the frequency of pulsed radio frequency signals comprising means for demodulating the pulse envelope from said pulsed radio frequency signals, a fixed frequency reference signal generator, means responsive to the trailing edge of said pulse envelope for causing the output of said generator to be coupled to said discriminator during a predetermined time interval, and means responsive to the output of said discriminator during at least a portion of said predetermined time interval for tuning said discriminator, said means responsive to the trailing edge of said pulse envelope further coupling the output of said discriminator to said tuning means during at least a portion of said predetermined time interval.

8. A system for controlling the center frequency of a radio frequency discriminator used to detect the frequency of pulsed radio frequency signals comprising means for demodulating the pulse envelope from said pulsed radio frequency signals, a reference signal generator, means responsive to the trailing edge of said pulse envelope for causing the output of said generator to be coupled to said discriminator during a predetermined time interval, means for storing the output of said discriminator during said predetermined time interval, switch means responsive to said means responsive to the trailing edge of said pulse envelope for connecting the output of said discriminator to said storing means during at least a portion of said predetermined time interval, and means responsive to the output of said storing means for tuning said discriminator.

9. In combination a radio frequency discriminator, a source of pulsed radio frequency signals coupled to the input of said discriminator, and means for automatically tuning said discriminator to a predetermined frequency comprising a reference signal generator having an output signal of a frequency corresponding to said predetermined frequency, a potential storage element, means responsive to the output of said storage element for controlling the tuned frequency of said discriminator, and means responsive to pulsed signals from said pulsed signal source for connecting the output of said signal generator to the input of said discriminator and the output of said discriminator to said potential storage element during a predetermined time interval following the time of arrival of pulsed signals from said pulsed signal source.

10. The device as recited in claim 9 wherein said means for controlling the tuned frequency of said discriminator comprises a diode connected across the tuning circuit of said discriminator.

11. In combination, a radio frequency discriminator, a source of pulsed radio frequency signals, a bi-directional switch connected to receive the output of said discriminator, a potential storage element connected to said switch, a frequency control element operatively connected to control said discriminator, the output of said storage element being connected to said frequency control element, a reference signal generator, said discriminator being responsively connected to said signal generator and said source of pulsed signals, a monostable multivibrator, an amplitude detector connected to receive the output of said pulsed signal source and said signal generator, and a differentiator connected to receive the output of said amplitued detector, the output of said differentiator being connected to drive said multivibrator, said multivibrator having two outputs, one of said multivibrator outputs being connected to said reference signal generator, the other of said multivibrator outputs being connected to control said bi-directional switch, whereby a control signal for tuning said discriminator to the frequency of the output of said reference generator is generated during a time interval following the time of arrival of pulsed signals from said pulsed signal source.

12. In combination, a radio frequency discriminator, a source of pulsed radio frequency signals, an amplitude limiter connected between said pulsed signal source and said discriminator, a pulse amplifier connected to the output of said discriminator, a bi-directional switch connected to receive the output of said pulse amplifier, a potential storage element connected to said switch, a frequency control element operatively connected to control said discriminator, the output of said storage element being connected to said frequency control element, a reference signal generator, a monostable multivibrator, an amplitude detector connected to the output of said amplitude limiter and said signal generator, and a differentiator connected to receive the output of said amplitude detector, the output of said differentiator being connected to drive said multivibrator, said multivibrator having two outputs, one of said multivibrator outputs being connected to said reference signal generator, the other of said multivibrator outputs being connected to control said bi-directional switch, whereby a control signal for tuning said discriminator to the frequency of the output of said reference generator is generated during a time interval following the time of arrival of pulsed signals from said pulsed signal source.

13. The device recited in claim 12 wherein said frequency control element comprises a diode, said diode being connected across the tuning circuit of said discriminator.

References Cited in the file of this patent

UNITED STATES PATENTS

| | | |
|---|---|---|
| 2,856,519 | Gray et al. | Oct. 14, 1958 |
| 2,915,631 | Nilssen | Dec. 1, 1959 |